(12) United States Patent
Baker

(10) Patent No.: US 9,096,801 B2
(45) Date of Patent: Aug. 4, 2015

(54) PROCESS AND PLANT FOR CONVERSION OF WASTE MATERIAL TO LIQUID FUEL

(75) Inventor: Garry Baker, Melbourne (AU)

(73) Assignee: FUTURE ENERGY INVESTMENTS PTY LTD, Melbourne (AU)

( * ) Notice: Subject to any disclaimer, the term of this patent is extended or adjusted under 35 U.S.C. 154(b) by 454 days.

(21) Appl. No.: 10/592,622

(22) PCT Filed: Mar. 11, 2005

(86) PCT No.: PCT/AU2005/000344
§ 371 (c)(1),
(2), (4) Date: Sep. 13, 2006

(87) PCT Pub. No.: WO2005/087897
PCT Pub. Date: Sep. 22, 2005

(65) Prior Publication Data
US 2007/0179326 A1    Aug. 2, 2007

(30) Foreign Application Priority Data

Mar. 14, 2004 (AU) ................................. 2004901325
Mar. 16, 2004 (EP) ..................................... 04006260

(51) Int. Cl.
| | |
|---|---|
| *C10L 5/00* | (2006.01) |
| *C10B 53/00* | (2006.01) |
| *C10G 1/02* | (2006.01) |
| *C10B 47/18* | (2006.01) |

(Continued)

(52) U.S. Cl.
CPC . *C10G 1/02* (2013.01); *C10B 47/18* (2013.01); *C10B 53/07* (2013.01); *C10G 1/10* (2013.01); *C10G 11/02* (2013.01); *C10G 11/05* (2013.01); *C10G 11/10* (2013.01); *C10L 1/08* (2013.01); *C10G 2300/1003* (2013.01); *C10G 2400/04* (2013.01)

(58) Field of Classification Search
CPC ................. C10J 2200/094; C10L 2200/0916; Y02E 50/30; Y02E 50/32
USPC .......................... 585/241; 201/21, 2.5; 44/628
See application file for complete search history.

(56) References Cited

U.S. PATENT DOCUMENTS

| | | | | |
|---|---|---|---|---|
| 3,901,951 | A | * | 8/1975 | Nishizaki ...................... 585/241 |
| 4,038,152 | A | * | 7/1977 | Atkins ............................ 201/2.5 |
| 4,147,593 | A | * | 4/1979 | Frischmuth et al. ............. 201/21 |
| 5,158,983 | A | * | 10/1992 | Stapp .............................. 521/41 |

(Continued)

*Primary Examiner* — Ellen McAvoy
*Assistant Examiner* — Ming Cheung Po
(74) *Attorney, Agent, or Firm* — K&L Gates LLP

(57) ABSTRACT

A process and plant for the thermocatalytic conversion of waste materials into reusable fuels and a fuel produced by the process, involving the steps of delivering melted waste material (11) to one or more pyrolysis chambers (26) via heated and valved manifolds (22) and effecting pyrolysis of the waste material into a gaseous state in an oxygen purged and pressure controlled environment. Pyrolytic gases are, then transferred to a catalytic converter (29) where the molecular structure of the gaseous material is altered in structure and form, with gases then transferred to one or more condensers (30*a*) to distil and cool gases in to their respective fractions. After post pyrolysis treatment, fuel fractions thon form a useable fuel. Includes the melting of waste (plastic) material (11) before delivery into any of the pyrolysis chambers (26), making the movement of material into the catalytic tower (29) a semi-continuous operation, directing melted waste material into one or more, but preferably four, pyrolysis chambers (26*a, b, c, d*), making each chamber capable of independent operation, optionally mechanically removing waste char from the pyrolysis chamber (107) by use of an internet auger (112) or other suitable means.

33 Claims, 7 Drawing Sheets

(51) Int. Cl.
*C10B 53/07* (2006.01)
*C10G 1/10* (2006.01)
*C10G 11/02* (2006.01)
*C10G 11/05* (2006.01)
*C10G 11/10* (2006.01)
*C10L 1/08* (2006.01)

(56) References Cited

U.S. PATENT DOCUMENTS 5,632,863 A * 5/1997 Meador ............................ 201/25
2002/0077516 A1* 6/2002 Flanigan ....................... 585/241
2003/0199718 A1* 10/2003 Miller ........................... 585/241

* cited by examiner

PROCESS AND PLANT FOR CONVERSION OF WASTE MATERIAL TO LIQUID FUEL

FIELD OF INVENTION

The present invention relates to the field of processing plastic and preferably waste plastic material into new products, which have valuable and useful properties. In one aspect, the present invention relates to a process for converting plastics to liquid hydrocarbons, particularly diesel fuel. It will be convenient to hereinafter describe the invention in relation to the conversion of plastics to diesel fuel, however it should be appreciated that the present invention is not limited to that use only.

BACKGROUND ART

Numerous unsuccessful attempts have been made in the past to efficiently reprocess a feedstock of waste plastics back into a liquid hydrocarbon product that has valuable and useful properties. A considerable tonnage of waste commodity plastics, or polymers, are improperly disposed of each year. In previous years, there has been considerable improvement in the collection and recycling of common waste polymers. However, the recycling and reuse of waste polymers, as now practiced without subsidies have proven to be uneconomic, forcing the abandonment of many recycling efforts. The recycling of waste polymers as fuel has also not proven practical because of the inability to collect sufficient quantities to sustain operation of the recycling machinery.

Thermolysis refers to the dissociation or decomposition of chemical compounds by heat and, in particulars is a process that has been described whereby plastic waste material is converted to liquid fuel by thermal degradation (cracking) in the absence of oxygen. Plastic waste is typically first made molten within a stainless steel chamber under an inert purging gas, such as nitrogen. This chamber then heats the molten material to a gaseous state that is drawn into a catalytic converter and cracked to form carbon chain lengths of a certain desirable range.

Hot pyrolytic gases of the desired carbon length range are then condensed in one or more condensers to yield a hydrocarbon distillate comprising straight and branched chain aliphatics, cyclic aliphatics and aromatic hydrocarbons. The resulting mixture is roughly equivalent to regular diesel fuel after the placement of additives and the implementation of other minor downstream processing actions.

Diesel fuel is a blend of hydrocarbon compounds known as distillates that are heavier than gasoline but lighter than lubricating oil. Diesel is a mixture of straight-chain and branched alkanes, cyclic saturated hydrocarbons and aromatics. Diesel fuel is designed to operate in a diesel engine only, where it is injected into the diesel engine combustion chamber wit compressed, high-temperature air and ignites spontaneously. Conversely, gasoline in a petrol engine is ignited by spark plugs. Diesel fuel produced by pyrolysis and other methods must meet a range of composition requirements before being certified for sale in a number of countries.

Existing thermolysis system based plants are in operation but display a series of significant shortfalls and disadvantages, which ultimately result in inefficient production and throughput of liquid hydrocarbons from waste plastic materials. A primary disadvantage is the process of loading plastic waste manually, and also the system being unable to receive variable sizes of plastic waste feedstocks. Existing Systems that receive manually loaded blocks or rolls of plastics leave a great deal of excess air space in the pyrolysis chamber, which must be sealed to allow purging of atmospheric gas and melting of the material. Once sealed, no further waste can be added to the chamber which otherwise has space for more material once it is melted. The inability to fill the pyrolysis chamber to its maximum reduces the speed of the entire process and ultimately the throughput of these known thermolysis systems.

Typically, the known thermolysis plants have two pyrolysis chambers, known as twin-chamber systems, which work together at an approximately equal rate. Of particular issue with the set up of existing pyrolysis chambers is that fuel may only be produced in a batch type basis. Once both chambers complete the pyrolysis of waste material in unison, it is necessary to wait for each to cool before unwanted carbonaceous char can be removed from the internal base of each chamber. It is therefore presently necessary to wait for each chamber to cool and be hand cleaned of char before the chambers can be used again for second and subsequent batches. Whilst it may be necessary in a batch process according to one aspect of the present invention to manually vacuum out char by access through the manhole (inspection port) in the chamber lid, in a preferred continuous process according to another aspect of the invention this issue is addressed below. In addition to this set-up limitation associated with batch processes, the physical size of the existing chambers greatly limits the batched throughput capacity of waste materials.

Of further issue with existing thermolysis systems are higher frequency clean out times of chambers, poor heat transfer within the waste feedstock itself increased process time per chamber load and also the expense and fouling of consumable catalysts. The final issue is the quality of the final fuel product including a measure of diesel fuel's ability to reduce wear on contacting solid surfaces found in some fuel pumps and injectors.

Of further issue with existing thermolysis systems is that fuel produced is often of a variable standard and cannot be used in engines and other machinery that lacks a tolerance to such fuel inconsistency. Of particular concern is the property of the fuels produced by these existing processes, which have a flash point generally varying between 25° C. and 45° C., which are too low due to the high presence of light fuel fractions. Such fuels are therefore unsuitable for the expected use in all regions of the world, and applications other than stationary engines. Other prior art processes produce heavier oils which are also unsuitable for diesel engine operation.

The above discussion and any other discussion of pre-existing documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure and claims herein.

In light of the foregoing discussion, an object of the present invention is to provide a thermolysis process that has an increased throughput of liquid hydrocarbons that are of consistent quality, using waste plastic stockfeed.

A further object of the present invention is to at least alleviate or overcome at least one disadvantage associated with the prior art.

SUMMARY OF THE INVENTION

The present invention provides a process for the thermocatalytic conversion of waste materials into reusable fuels, comprising the steps of delivering waste material to a melting means; directing melted waste material from one or more manifolds into one or more pyrolysis chambers heating waste material to effect pyrolysis of material into a gaseous state in a substantially oxygen purged and pressure controlled environment; transferring resulting gases to a catalytic converter means wherein the molecular structure of the gaseous material is altered in structure and form; transferring gases to one or more condenser means to distil and cool gases in to their respective fractions; and wherein the fractions form at least one type of useable fuel.

In another aspect, the present invention provides a process for the conversion of waste organic plastic materials into diesel fuels, including the steps of:

b) delivering the comminuted waste material to a melting means;

c) transferring the melted waste material to one or more pyrolysis chambers;

d) heating waste material to effect pyrolysis of material into a gaseous state in a substantially oxygen purged and pressure controlled environment;

e) transferring the gaseous material to a catalytic converter means wherein the molecular structure of the gaseous material is altered; and f) transferring gases to condenser means to cool and separate the gaseous material into fractions to form at least one type of useable fuel.

The raw waste plastic material may initially be fed into the melting means. However, preferably the waste material is subject to preliminary processing whereby the inventive process includes the preliminary step of:

a) comminuting the waste material.

Step a) may comprises mechanically working bodies of waste material, such as sheets, clumps, blocks, lumps and other forms, to break the material into smaller pieces or particulate material such as flakes having a high surface to volume ratio. The advantages of comminuting the waste plastic material include:

i) the feeding of the waste material in the net step in the process is made easier as the material may be conveyed by a variety of means including blowing, gravity feed, etc., through an delivery means or opening of optionally limited width or size; and ii) the duration or energy required for the melting means is reduced as the individual particles are easier to melt and the heat transfer between particles in enhanced.

In another aspect, the invention provides a plant for the conversion of waste plastic materials into diesel fuels, the plant including:

a) comminuting means for breaking the waste material into particulate matter;

b) melting means for receiving and melting the particulate waste material;

c) pyrolysis chamber for receiving waste material, the pyrolysis chamber operative to:

i) seal the chamber from the environment and to purge air-borne oxidants from the pyrolysis chamber by the introduction of a non-oxidising gas; and ii) heat the waste material to effect pyrolysis of the waste material into a gaseous state in a substantially air-borne oxidant-fee and pressure-controlled environment;

d) catalytic converter means operative to receive and crack the gaseous waste material whereby the molecular structure of the gaseous material is altered; and e) condenser means operative to receive, cool and separate the cracked gaseous material into fractions to form at least one type of useable fuel.

The pyrolysis chamber may include an auger to remove accumulating char from the base of the pyrolysis chamber and allow continuous feed of molten waste material into the pyrolysis chamber and continuous production and delivery to the catalytic converter means of the of the gaseous waste material.

The heat source required for the melting means may involve a furnace or electrical heating means having an independent heating source not associating with another part of the process. Alternatively, heat energy from another part of the process may be reclaimed and/or recycled and used for the melting means. In a preferred form, the heat energy from heating means of one or more of the pyrolysis chambers is directed to the melting means. For example, where the pyrolysis chamber is heated by a furnace, the hot exhaust gases may be reclaimed and used to heat the melting means. The hot exhaust gases may be fed directly coils surrounding a melting means chamber or may transfer heat energy to the melting means via a heat exchanger. The heat exchanger way utilise a suitable heat exchange fluid such as steam or, more preferably, oil.

The condenser means may include a selective low-temperature condenser operative to remove light fractions from the cracked gaseous material. The condenser means may differentially condense different fractions of the gaseous product from the catalytic converter means to select one or more fractions suitable for use as a fuel. For example, the condenser means may include two more condensers capable of condensing fractions at different temperatures or ranges thereof. In a preferred aspect, the condenser means includes a condenser for obtaining fractions suitable for diesel fuel and light fractions to be utilised or disposed of.

In a preferred aspect, the invention provides for a process for the thermocatalytic conversion of waste materials into reusable fuels, wherein melted waste material is directed into one or more pyrolysis chambers that are capable of independent operation.

In a further preferred aspect, the invention provides for a process for the thermocatalytic conversion of waste materials into reusable fuels, wherein a plurality of pyrolysis chambers operate independently to allow cyclic transferal of gaseous material from one or more pyrolysis chambers to a catalytic converter means.

In a further preferred aspect, the invention provides for a process for the thermocatalytic conversion of waste materials into reusable fuels, wherein a plurality of pyrolysis chambers are used alternately at least one at a time so that one pyrolysis chamber is able to cool while another pyrolysis chamber is able to transfer gaseous material to a catalytic converter means.

In a further preferred aspect, the invention provides for a process for the thermocatalytic conversion of waste materials into reusable fuels, wherein one or more pyrolysis chambers are actively cooled after completing transferral of gaseous waste material to a catalytic converter means.

In a further preferred aspect, the invention provides for a process for the thermocatalytic conversion of waste materials into reusable fuels, wherein char is mechanically removed from one or more pyrolysis chambers by use of one or more augers. This automated method of removing char from the chamber allows the chamber to perform a semi-continuous operation because the need to remove char manually from the chamber after a particular batch is eliminated. Although char may continue to accumulate in the chamber over time, the rate of accumulation is slower due to the continual removal of a large proportion of the char produced. Much less frequent manual removal of the char from the chamber may therefore be required.

Accordingly, in a further preferred aspect, the invention provides for a process for the thermocatalytic conversion of waste materials into reusable fuels, wherein the process is at least semi-continuous in operation. The continuous process thermolysis system may operate, in principle, similar to a batch system. It may have, however, several distinct refinements that differ from the batch system. Principally, the continuous process may include a continuous feed system to the pyrolysis chambers and/or distillation columns in lieu of one or a series of condensers.

The thermolysis continuous process plant may use the thermocatalytic conversion of waste plastic into useable clean fuel (for example, diesel fuel, also known as middle distillate). This system can use contaminated plastics in the process. The level of contamination will, however, affect yield rates, as less plastic per volume is processed. The process thermally degrades (cracks) plastic Waste in an oxygen free environment inside a pyrolysis chamber, pyrolysing (cracking) it into a gaseous state. The hot pyrolysis gases may pass through a catalytic converter. The catalytic converter may include a number of catalytic surfaces. Preferably, the catalytic surfaces comprise alloy plates and, more preferably, these catalytic surfaces characterised by not being able to be poisoned or consumed. Two reactions occur in the process. A first reaction involving cracking occurs while the plastic is heated and a second reaction occurs when the hot pyrolysis gases contact the alloy plates. The gases are then cracked and reformed to form carbon chain lengths of a certain desirable range.

Hot pyrolytic gases of the desired carbon length range may then be condensed in one or more condensers or, more preferably, in one or more distillation towers, to yield a hydrocarbon distillate comprising straight and branched chain aliphatics, cyclic aliphatics and aromatic hydrocarbons. The resulting mixture is preferably roughly equivalent to regular diesel fuel after the placement of additives and the implementation of other minor downstream processing actions, such as the removal of particularly light fractions. Thus the inventive process may produce fuel that is substantially equivalent to the diesel fuel standard in Australia, specified as AS 3570-1998.

In a further preferred aspect, the invention provides for a process for the thermocatalytic conversion of waste materials into reusable fuels, wherein the process uses at least four pyrolysis chambers which receive melted waste material by selective operation of a manifold system having a corresponding number of inlet pathways. The manifold system is preferably pre-heated, optionally using hot exhaust gases from, for example, the pyrolysis furnace. The four-way manifold is preferably adapted to automatically feed each of four pyrolysis chambers in turn.

In a further preferred aspect, the invention provides for a process wherein the waste material includes or consists of polyolefins and/or other material considered waste material for the purposes of the invention. The waste materials are preferably selected from the group consisting of addition polymers, condensation polymers, and combinations thereof. The waste organic materials are preferably selected from the group consisting of waste plastic, used oils and lubricants, and combinations thereof.

In a further preferred aspect, the invention provides for a process wherein the waste organic materials are selected from the group consisting of aliphatic species, aromatic species, species containing both aliphatic and aromatic substituents, and combinations thereof.

In a further preferred aspect, the invention provides for a process wherein the melting means is a hot-melt in-feed system. The melting means may be located prior to the pyrolysis chamber.

In a further preferred aspect, the invention provides for a process wherein the catalytic converter consists of a series of high-surface area, internal metal plates that are the catalyst. The plate catalyst preferably is selected from the group including ceramics, zeolites, the silicates of iron $Fe^{3+}$, cobalt $Co^{2+}$, nickel $Ni^{2+}$, Raney nickel, manganese $Mn\backslash^{2+}$, chromium $Cr^{3+}$, copper $Cu^{2+}$ and/or their mixtures or the catalyst MCM-41.

In a further preferred aspect, the invention provides for a substantially carbon based fuel product produced by the process of the invention, the fuel including carbon chains in the range of length C6 to C25. The substantially carbon based fuel product preferably includes carbon chains in a range peaking at lend C16. Preferably, the substantially carbon based fuel product that is substantially equivalent to the diesel fuel standard in Australia, specified as AS 3570-1998 Reusable hydrocarbons and reusable fuels include liquid hydrocarbons. The fuel product may be stored in a storage vessel. The storage vessel is preferably a storage tank.

In the inventive process, the following are further preferred options. Drawing off may be by a screw drive system. A pipe means may be a heated lag pipe. A manifold may be a heated 4-way manifold. The manifold may direct melted waste to one of four pyrolysis chambers. The oxidative atmosphere in the pyrolysis chamber must be neutralised, for example, by purging oxygen and other air-born oxidants from the chamber by the introduction of a gas. The purge gas is preferably selected from the group consisting of nitrogen, helium, or other inert gases or combinations thereof.

In a further preferred aspect, the invention provides for a process wherein the pyrolysis chamber heating range is 390° C.-410° C. The pyrolysis chamber heating range may, however, have a wider range of 350° C.-425° C. The pyrolysis chambers is preferably pressurised to a pressure of 1.08 bar.

In a further preferred aspect, the invention provides for a process when the catalytic converter uses no consumable catalyst. The gaseous material is preferably pyrolised to form hydrocabon molecules. Excess non-condensable (very light) gases may be transferred through a caustic wash to remove acids, then to an off-gas chamber where they can be destroyed. The catalytic convener is preferably adapted to modify carbon chains longer than C25 and to reform carbon chains shorter than C6. The catalytic converter is preferably heated to 220° C. or greater. The metal catalyst will preferably 'crack' parafinic chains longer tan C25. The catalyst preferably ensures that the final fuel has a carbon chain distribution in the range C8-C25 and peaking at C16 (cetane). The catalytic converter is preferably heated by exhaust gases from the furnace of one or more of the pyrolytic chambers. Similarly, the hot melt chamber may be heated by exhaust gases from the furnace of one or more of the pyrolytic chambers. The non-condensable gases may be directed to the furnace for burning.

In a further preferred aspect, the invention provides for a process wherein the condensing temperature is not consistent across all elements of the condensing system. The upper condensing coil is preferably run at a lower temperature than the lower condensing coil, for example, to separate the light fractions from the remaining fractions best suited for a middle distillate composition. The separation of the light fraction may be carried out dug the thermolysis process.

Other aspects and preferred aspects are disclosed in the specification and/or defined in the appended claims, forming a part of the description of the invention.

Advantageously, the invention provides a new process that has the capacity, compared to the prior art, to greatly increase the throughput of waste plastic stockfeed to produce liquid hydrocarbon fuel that is of a consistent quality. This throughput is primarily achieved by the method by which waste stookfeed is prepared and delivered into a pyrolysis chamber system. Advances made by the invention process include melting waste (plastic) material before delivery into any of the main pyrolysis chambers, for example, by use of a hot-melt in-feed system to affect a greater fill and therefore the efficiency of each pyrolysis chamber. Further advances are made by making the movement of material into the catalytic tower a semi-continuous operation. This semi-continuous operation is in part achieved by:

Directing melted waste material into a minimum of one pyrolysis chamber, but preferably two or more, and most preferably four pyrolysis chambers, each chamber preferably being capable of independent operation.

The optional use of a pre-heated four-gray manifold system having a corresponding number of inlet pathways that may be adjusted to direct melted waste material into one or more of the pyrolysis chambers.

Where more than one pyrolysis chamber is employed, cooling one pyrolysis chamber while another pyrolysis chamber is able to maintain operation to continue to transfer gaseous material to a catalytic converter means.

Mechanically removing waste char from one or more pyrolysis chambers by use of one or more internal augers or other suitable means.

Further aspects of invention relate to various performance improvements to the overall process as disclosed herein.

The process and associated apparatus of the present invention have been found to result in one or more of the following advantages:

reduction or elimination of manual handling of the plastic feedstock, shortening the time taken to get the prime pyrolysis chamber to full operating temperature;

achieving 100% molten plastic feistock capacity prior to prime chamber operation commencement—this maximises the volume of material in each chamber before treatment commences;

improved uniformity of temperature, heat transfer to materials and pyrolysis;

improved fuel consistency; and reduction in the effort and time required for the removal of charring and in system cleaning.

The above advantages result in the expansion of the throughput and production capacity (compared to the prior art Systems) to 9,500 litres per day from 10 tonnes of waste plastics. Active cooling increases each chamber cycle time per day from one current cycle per day to approximately 2.5 cycles per 48 hour period (per chamber) increasing the capacity of the system to process up to 12.5 tonnes per 24 hour period, yielding approximately 11,750 litres of fuel oil and approximately 750 litres of lights per 24 hour period, ("lights" being a type of white spirit (light hydrocarbon)).

BRIEF DESCRIPTION OF THE DRAWINGS

Further scope of applicability of the present invention will become apparent from the detailed description given hereinafter. However, it should be understood that the detailed description and specific examples; while indicating preferred embodiments of the invention, are given by way of illustration only, since various changes and modifications within the spirit and scope of the invention will become apparent to those skilled in the art from this detailed description.

Further disclosure, objects, advantages and aspects of the present application may be better understood by those skilled in the relevant art by reference to the following drawings of preferred embodiments which are given by way of illustration only, and thus are not limitative of the present invention, and in which.

DETAILED DESCRIPTION

Unless defined otherwise in this specification, all technical tears are used herein according to their conventional definitions as they are commonly used and understood by those of ordinary skill in the art.

Figure 1:
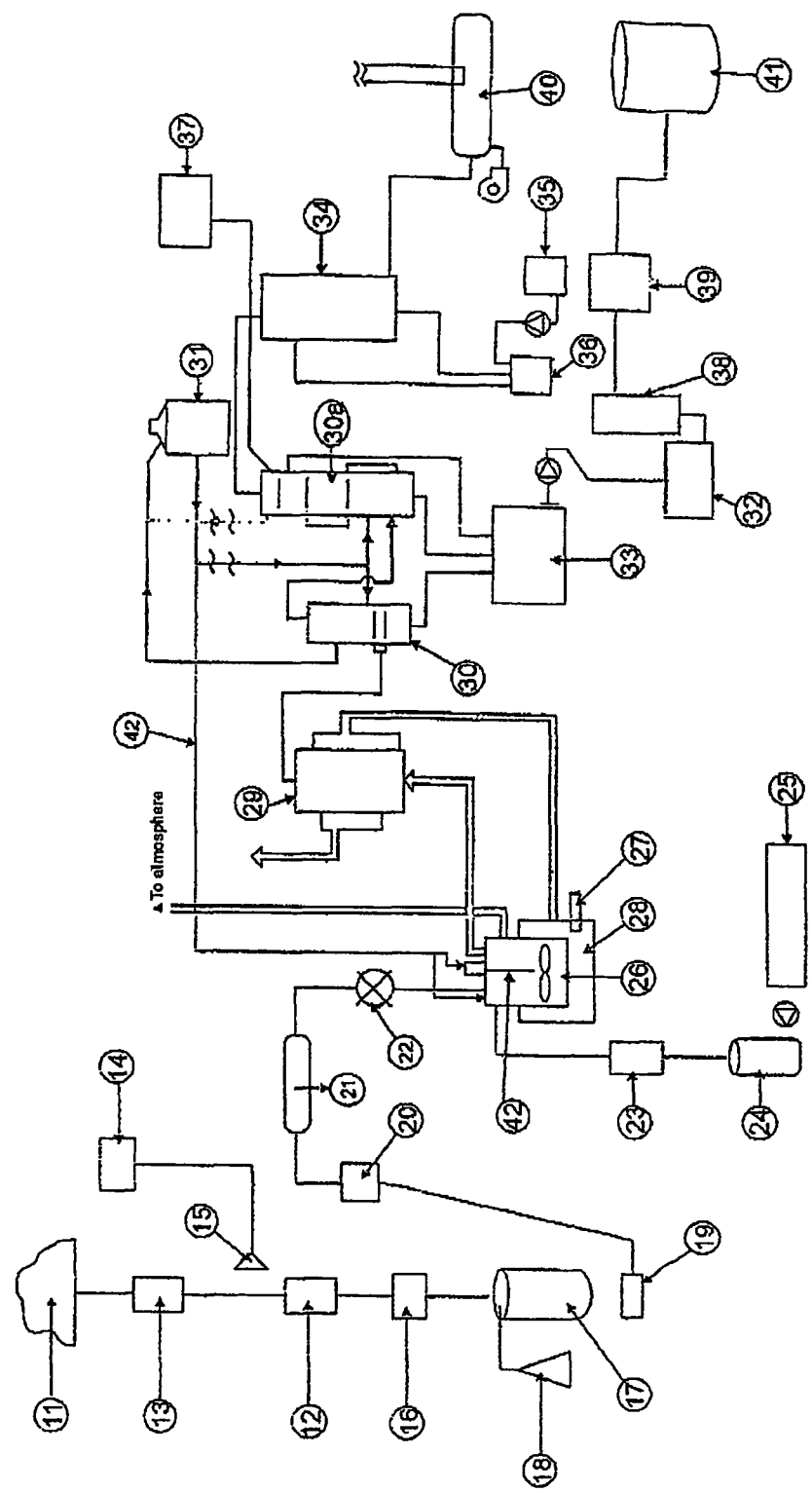
FIG. 1 illustrates a diagrammatic overview of a thermolysis system with major features according to a first preferred embodiment of the present invention.
Figure 2:
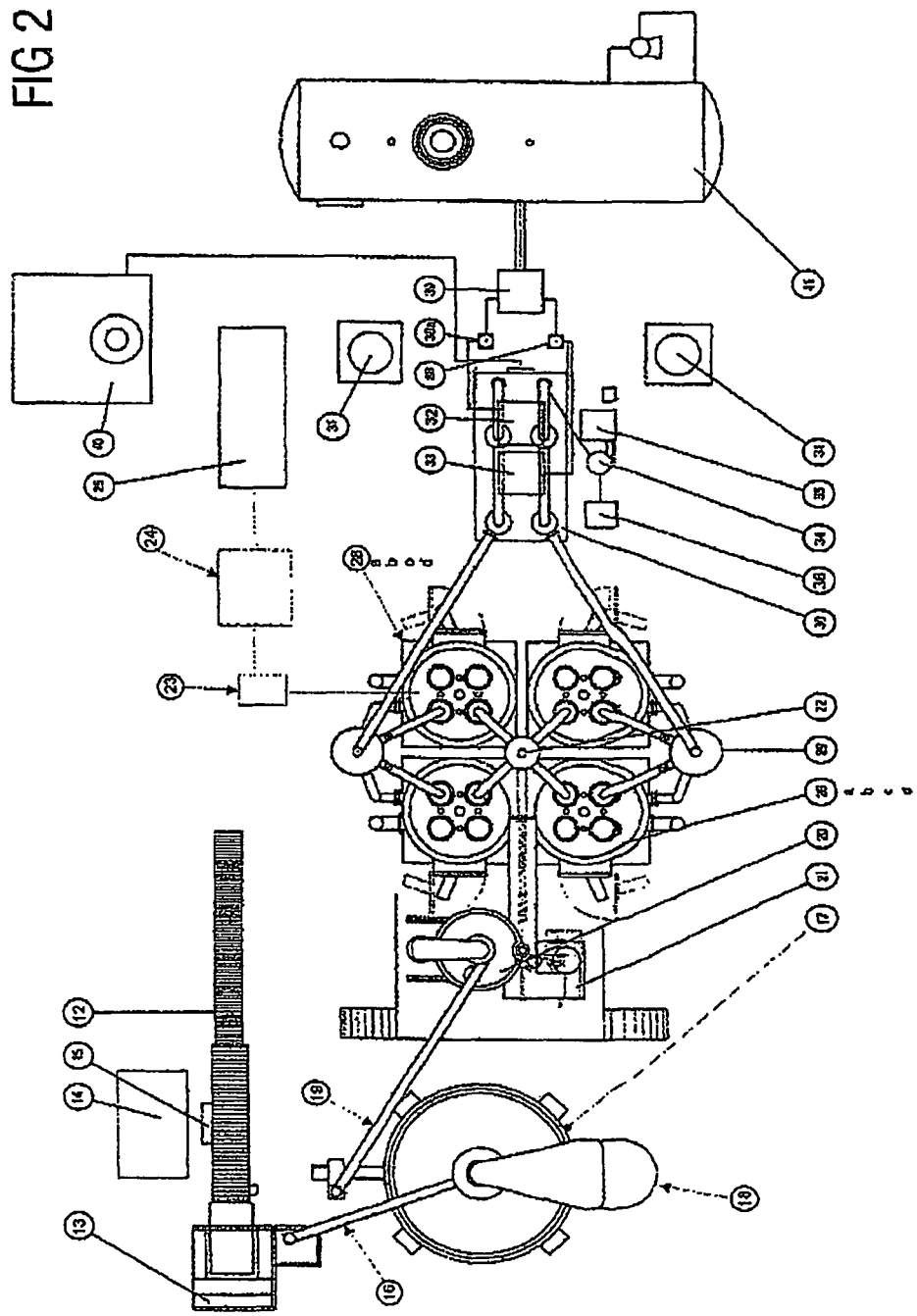
FIG. 2 illustrates a plan view of a plant layout of a thermolysis system according to the first preferred embodiment of the present invention.
Figure 3:
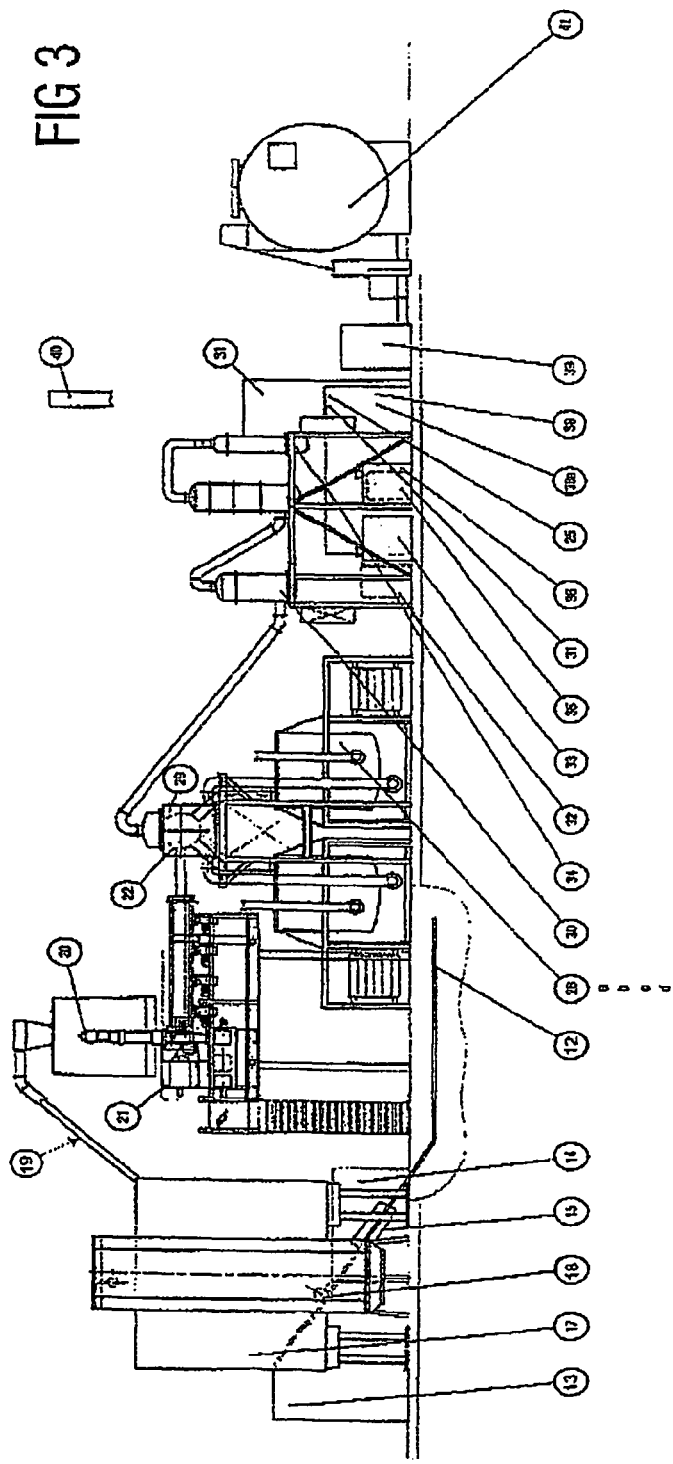
FIG. 3 illustrates an elevation or side view of the plant layout shown in FIG. 2.

Referring to the figures wherein like reference numerals designate like or corresponding parts throughout the several views, and referring particularly to FIGS. 1, 2 and 3, an overview process 6 and plant set up for converting waste plastic to diesel fuel using a batch process according to the invention is shown.

Early Process Operation

Waste plastics in their original form of plastic sheets, drums, rolls, blocks and flat pieces are placed in a stockpile 11 and moved via an underfloor variable speed pan conveyor 13, through to a granulator 12 to reduce the size of the large items of waste plastic. An over-band magnet 15 and metals container (14) is situated above the conveyor 13 to remove any metals prior to entry into the granulator 12. From the granulator 12, the reduced plastics are delivered (for example, by conveyor, auger or blower) through to a fluidised holding silo 17. Although a variety of mechanisms could be used to transfer the plastic from one place to another, delivery in this preferred method is achieved via a blower 16. A dust collector 18 associated with the holding silo 17 collects excess dust created by the action of the blower 16. All operations just described are preliminary preparations and may or may not be completed outside the normal operating times of the general thermolysis system discussed below.

Batch Thermolysis Process

To begin the thermolysis process, granulated waste plastics are drawn from the holding silo 17 via a second blower 19 and force feeder 207 into a hot-melt feed system 21 including an extruder, which melts the waste plastics to a suitable temperature for adequate liquefied flow into a heated melt distribution manifold 22 via heated pipes which maintain adequate flow rates. The distribution manifold 22 is a valve operated system allowing distribution of liquid waste through four separate outlet pipes which each lead to a separate pyrolysis chamber 26a, 26b, 26c or 26d. Although the description is made with reference to four chambers, it is to be understood that the present invention is applicable to any number of chambers, designated at feature 26 herein. The chamber receiving liquid waste is preferably filled to 80% capacity with liquid waste and then sealed and atmospheric ambient gases are substantially purged through the introduction of a preferably nitrogen as blanket. Nitrogen is sourced from the nitrogen generator 25, through a nitrogen storage vessel 24, according to a nitrogen monitoring device 23. The gas used to purge the atmospheric gas may otherwise be selected from the group consisting of helium, or other inert gases or combinations thereof.

Each pyrolysis chamber is situated inside a heating unit, such as a furnace 28 with a natural gas burner 27. Furnace heat is applied to bring the internal temperature of the main pyrolysis chamber up to a temperature between 375° C. and 420° C. Standard internal rotating agitators 42 ensure even heat transfer and a homogenous plastic mixture. Non feedstock materials or contaminants then fall to the bottom of the chamber 26 to create a carbonaceous char material which must be regularly removed before it builds-up on the pyrolysis chamber walls, wherein it acts as a thermal insulator and lowers the heat transfer to the plastic waste material. Char is therefore removed by suite means, such as being continually scrapped off by rotating blades so that liberated char accumulates as a friable fine black powder at the bottom of the pyrolysis chamber, wherein it is vacuumed out by hand after each batch. However, as will be explained below with reference to an alternative continuous process, an auger positioned at the base of the chamber can be used to periodically remove accumulated char.

To effect faster input and output of waste material, active cooling is achieved by cooling the inside of each chamber with $N_2$ from the $N_2$ line and external cooling of the chamber by the burner fan blowing air around the chamber inside the furnace, which is used on each of the main chambers 26 to reduce the cooling time from the standard (prior art) 12 hours to a maximum (for the plant and process of the invention) of 7 hours, allowing faster turnaround between one process cycle and the next. Cooling may be implemented by fan or by other suitable cooling means known in the art.

With a system of at least four pyrolysis chambers available for operation, one or two chambers may be set to operate and deliver pyrolytic gases to the catalytic converter 29. While one or two chambers deliver these gases as required, the remaining chambers may be prepared for a subsequent batch of molten plastic input from the hot melt system, thus allowing a semi-continuous operation and fuel output as a result of staggering the operation of the chambers. The valved heat distribution manifold 22 may be used to direct molten plastic material into any of the chambers as necessary to allow for system operation in a semi-continuous manner.

The next chamber in sequence of operation is pre-heated to between 170° C.-220° C. while the liquefied feedstock fills the chamber to 80% capacity. Upon completion of filling, the selected main chamber temperature is raised to between 375° C. and 420° C. and the liquid waste plastic in the sealed chamber is made gaseous by pyrolysis at this temperature causing at least partial breaking of carbon chain lengths randomly into various lengths.

The pyrolised gases are then drawn through into a catalytic converter reaction tower 29 where the gas components are themolytically cracked, The catalytic reaction tower 29 contains a system of plates made from a special catalytic metal alloy. The metal plates are positioned so that the hot pyrolytic gases must take a torturous path to maximize contact area and time with the metal plates. The catalyst chamber 29 is heated to 220 Deg. C or greater using the exhaust gases from the furnace of the selected pyrolysis chamber 26. The metal catalyst cracks carbon parafinic chains longer tan C25 and reforms chains shorter than C6. There is conversion of alpha-olefin chains (1-alkenes) to saturated alkanes. The catalyst ensures that the final fuel has a carbon chain distribution in the range C8-C25 and peaking at C16 (cetane). The metal catalyzers are made of metals including Ni and Cu, or ceramics or zeolites in shape of punched plate and wire mesh type. The other catalysts include MCM-41 and the silicates of iron $Fe^{3+}$, cobalt $Co^{2+}$, nickel $Ni^{2+}$, Raney nickel, manganese $Mn^{2+}$, chromium $Cr^{3+}$, copper $Cu^{2+}$ and/or their mixtures. The catalytic plates may be made from any one of these metals, or a combination thereof. The catalyst is preferably not consumed or poisoned. The catalytic tower 29 uses technology known in the petrochemical industry and all detail concerning the processes of the reaction tower are publicly available in JP 3344952.

Thermalytically cracked gases arm then drawn from the reaction tower 29 into one or more condensers 30 and/or 30a, where gases are distilled into separate factions. Condenser 30 cools and distils the gases, drawing off liquids condensed by contact with a 60° C. inlet temperature condensing coil. Condenser 30a cools and distils gases using two inlet temperature coils and a top condensing coil having an inlet temperature of 8° C. for light fractions. There are three cooling coils in the second condenser 30a and these are cooled with cooling tower water or water chiller units 31. Water flows through preferably three coils run co-current with the direction of pyrolysis gas flow. At each coil position there is a catchment tray and a bubble cap so the hot pyrolysis vapours must flow trough tie condensing coils. This allows efficient condensation of the pyrolysis condensates. Cooling tower or chiller water also flows to some of the seals throughout the line to keep them cool. In particular, seals that are most advantageously cooled include the agitator seal on the agitator shaft 42 and the seal on the chamber 26 inspection port (man hole) in the chamber lid.

The remaining non-condensable gases (NCG) not condensed by the 8° C. condensing coil are piped through to a gas scrubber 34 which supplies mildly basic water to scrub o-at the acid, neutralize the remaining NC is and render the gases suitable for incineration by the off-gas burner 40. Alternatively, the gas may be recycled to a burner in the furnace as necessary. A caustic water tank 36 supplies alkaline water which is regularly dosed with caustic from a caustic make up tank (35) via a dosing pump to maintaining the correct pH value in the caustic water tank 36.

From the condensers, the bulk of fractionated fuel that is not the light component is piped into an oil recovery tank 33, or other operating tanks designed for the storage of liquid fuels, in this embodiment intermediate tanks 32. The fractionated fuels is then piped to a centrifuge 38, noting that more than one centrifuge may be necessary depending on the production volumes. The centrifuge removes carbon particles, water, ammonium hydroxide and other contaminates that may be present in the fuel. The fuel is then pumped to quality assurance tanks (QA) 39, from which it is sent to mass storage tank 41.

Carbon Chain Length Distribution

The resultant liquid fuel is not a 'pure' compound but a mixture of straight-chain and branched alkanes, cyclic saturated hydrocarbons and aromatics consistent with a premium diesel fuel composition. The finished cleaned file's are piped to a storage tan 41, for later distribution, by various means consistent with diesel fuel handling requirements.

Figure 4:
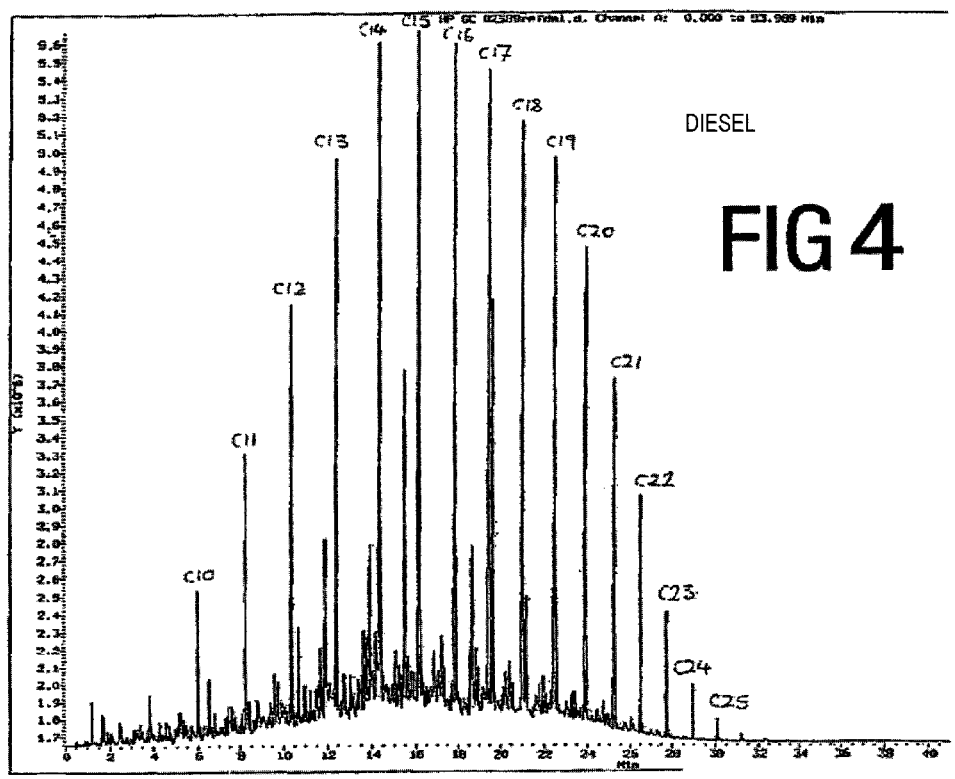
FIG. 4 illustrates a gas chromatography chromatogram chart indicating the relative proportion of carbon chain lengths within normal diesel fuel. The Y axis of this chart indicates the quantity.
Figure 5:
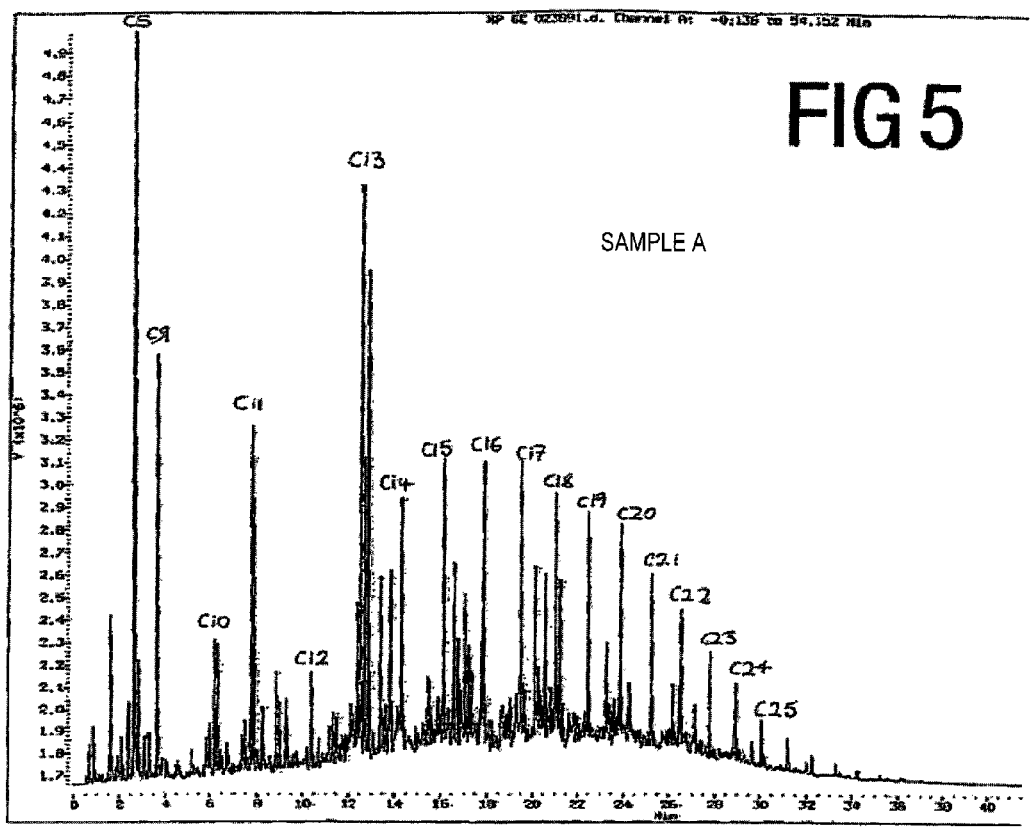
FIG. 5 illustrates a gas chromatography chromatogram chat indicating the relative proportion of carbon chain lengths within diesel fuel produced by the thermolysis system of the first preferred embodiment of the present invention. The Y axis of this chart indicates the quantity.

With particular reference to FIGS. 4 and 5, thermolysis diesel made by the batch process as described above and regular (conventional) diesel fuel have been analyzed by gas chromatography (GC). The resultant chromatograms give a 'fingerprint' of the diesel with respect to the proportion of hydrocarbon chains of various carbon chain lengths. To perform as diesel fuel, the inventors have found that the fuel must be substantially rich in chains with a carbon chain length peaking around C16 (i.e. cetane). With reference to FIGS. 4 and 5, the carbon chain length distribution curve for regular diesel and thermolysis diesel produced in accordance with the present invention respectively are shown. It is important to note that a higher proportion of light fraction (especially C8, C9, C11 and C13) is demonstrably present in the thermolysis produced fuel shown in FIG. 5 compared to regular diesel shown in FIG. 4.

Flash Point Modification

To meet the relevant standards for transportation diesel fuel (e.g. AS3570-1998), it is necessary to increase the flash point of the thermolysis diesel to above 45° C.-53° C., preferably up to at least 61.5° C. or a relevant minimum specification of standard. This can be achieved by removing a proportion of the light fraction in the fuel (approx. 5-7% by weight). It is accordingly necessary to strip the lights fraction from the thermolysis diesel. This is achievable by recovering the light fraction with boiling points less than 160 Deg. C, which accounts for about 5-7% of the thermolysis fuel (see table below).

The light fractions condensed in the top 8° C. condensing coil of the second condenser 30a are treated separately from the heavier fractions. The light liquids steam is piped to a lights tank 37 where it is stored. The lights are separated from the heavier fractions to ensure that the heavier fractions (diesel file) remain at specified flash points, not less than 61.5° C.

TABLE 1 discloses the full distillation range data [in accordance with American Society for Testing and Materials standard ASTM D86] for diesel made according to batch process described above (and regular diesel fuel in parenthesis):

| | | |
|---|---|---|
| Initial boiling point | 141.5 deg. C. | (190 deg. C.) |
| 5% recovery | 154.5 deg. C. | (210 deg. C.) |
| 10% recovery | 172.5 deg. C. | (240 deg. C.) |
| 20% recovery | 209.5 deg. C. | (250 deg. C.) |
| 30% recovery | 245.5 deg. C. | (265 deg. C.) |
| 40% recovery | 270.5 deg. C. | (270 deg. C.) |
| 50% recovery | 282.5 deg. C. | (285 deg. C.) |
| 60% recovery | 290.5 deg. C. | (295 deg. C.) |
| 70% recovery | 297.5 deg. C. | (310 deg. C.) |
| 80% recovery | 307.5 deg. C. | (330 deg. C.) |
| 90% recovery | 321.5 deg. C. | (345 deg. C.) |
| 95% recovery | 332.5 deg. C. | (360 deg. C.) |
| Final boiling point | 348.5 deg. C. | (380 deg. C.) |
| Recovery | 98% (98.5%) | |
| Loss | 1% (0.5%) | |
| Barometric reading | 102.5 kPa | |

In order to shift the boiling point range to a higher temperature and concomitantly increase the flash point of the fuel, any one or more of a number of inline strategies can be employed as part of the thermolysis process of the invention:

(i) Operate the condenser coils (not shown) at a higher operating temperature thus preventing condensation of tie lighter fractions and allowing these them to carry on in the gas stream to the acid scrubber 34 and subsequently to the off gas burner 40.

(ii) Heating the fuel in the primary oil recovery tank 33 by running heating fluid through the heat exchanger coils. In this way the light fraction can be taken off while the process is running. The heating coils use hot water to prevent waxing in the bottom of the tanks but hot thermal fluid (heat transfer oil) may be used to keep the tanks around 80-100 deg. C. Under these conditions the light vapours gently flash off. Because the venting of flammable hydrocarbons to he atmosphere is not permitted in many countries, it is preferable and mandatory in some countries to send these light gases to the off gas burner 40 or to otherwise capture them for disposal, recycling or use as light fuel (iii) Although it is not permitted to process flammable liquids in centrifuges for health and safety reasons in many countries, it is technically possible to do so provided suitable health and safety practices are followed.

Each of the above techniques for removing the unwanted light fraction can be used individually or in any combination thereof.

Thermolysis Process Mass Balance

As an example of the use of the present invention, the following details are provided by way of example only and the invention is not to be construed as being limited by the following:

MASS BALANCE FOR THERMOLYSIS PLANT–PER 1000 kg of processed clean feed stock made by the batch process according to one aspect of the invention.

1. Material Input 10,000 kg of post industrial waste, composed of 55% polyethylene (PE) 28% polypropylene (PP) and 17% polystyreno PS) *

Natural gas for furnace burner=75 Gj or 2100 m³

Nitrogen gas=1.7 m³×4=6.8 m³

2. Outputs 10-15% Non condensable gases ‡ by weight kg ‡‡

3-5% (Wt) char residue

Waste fraction from centrifuge=10 kg (carbon, tar and water)

Remaining, approximately 8,250 kg liquid fuel/0.81 SG produces yield of 10,185 litres Removal of 6% of light fractions in process produces on "spec" diesel fuel of nett. 9,574 litres.

Ammoniated water from centrifuge=88 L×0.9 (density)=79.5 kg

Scrubber waste stream=<3.3 kg (neutralized by NaOH)

Notes:

* The above mass balance is for clean PE/PP/PS feedstock. If the feedstock is post-consumer PE containing contaminates, the solid residue portion of the feedstock would be expected to be at least 5% by weight of feedstock. Also the waste portion from centrifuge would also be expected to increase as the contaminates are expected to contain water which would be processed within the chamber.

‡ Off-gas composition is mainly saturated short-chain hydrocarbons including methane, ethylene, ethane, propylene, propane, n-butane and iso-butane.

‡‡ Flue gas composition from off-gas incinerator is:

| | |
|---|---|
| No$x$ | 198 ppm |
| SO$x$ | <5 ppm |
| Temp. | 438 deg. C. |
| H2O content | 13% |
| dust density | 0.06 g/m3 |

Semi-Continous Thermolysis Process

Figure 6:
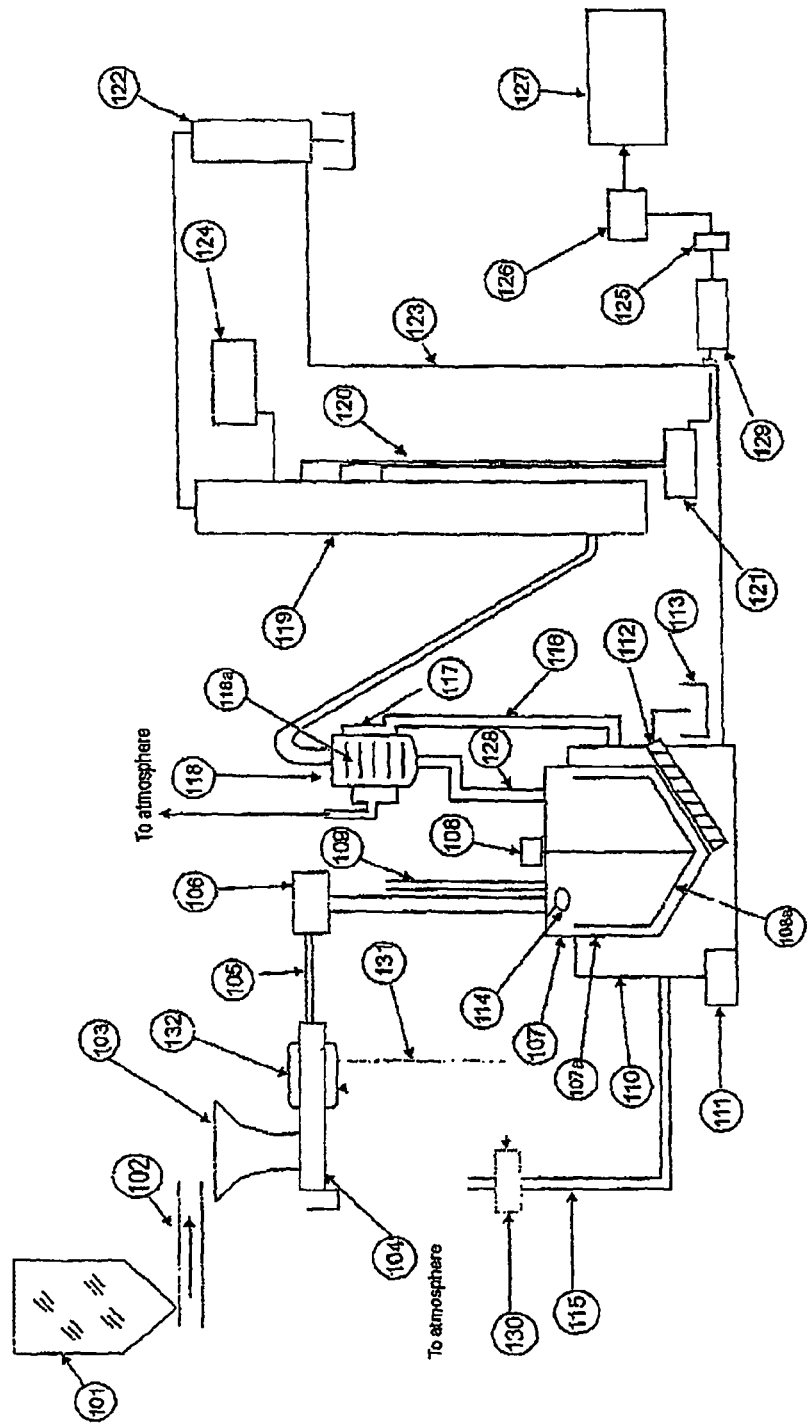
FIG. 6 illustrates a diagrammatic overview of a thermolysis system with major features according to a second preferred embodiment of the present invention.

A second embodiment of the invention will now be described with reference to FIG. 6. The thermolysis chamber and down stream train are purged by an inert gas, like nitrogen, through pipe line 109, Nitrogen can be supplied from a nitrogen generator or from gas bottles. The nitrogen is managed by a monitoring device in the main control cabinet PLC and computer system and discrete controllers.

Plastic flake (<15 mm$^2$) is delivered by any means into the fluidized silo 101. The plastic flake is then taken by a conveyor or anger 102 or blown, to the crammer 103. The plastic is then compressed by the crammer and delivered into a preheated extruder barrel 104 (heated steel barrel with screw). The barrel 104 is jacketed 132 and heated via heating medium which is transferred from the heating medium vessel 130. The heating medium vessel 130 contains a medium, like oil, that is delivered to the heating jacket 132 of the barrel via the heating medium piping 131. The heating medium vessel 130 is heated from the hot flue gases being exhausted from the furnace 110 via exhaust flue 115. The plastic is melted inside the barrel between 120-280° C. The melted plastic is forced along by the rotation of the screw inside the barrel directing the melted plastic through the hot melt line 105. The line is pre-heated by electric or other means in case of cold starting through a two way valve 106 (this valve will not exist in a single chamber system) which directs the hot melted plastic into the pyrolysis chambers or single chamber 107. The pyrolysis chamber is situated within the pyrolysis chamber furnace 110. The pyrolysis chamber, usually manufactured from stainless steel, is preheated to 200-270° C. by the burner 111. When the melted plastic begins to flow into the chamber, the agitator 108 is activated. The agitator 108 rotates inside the pyrolysis chamber 107, the blades of the agitator 108 having a close tolerance clearance between the walls 107a of the chamber 107 and the edge of the blades 108a. The blades 108a substantially span the inside diameter of the chamber and extend up the walls 107a of the chamber 107 slightly protruding, beyond the liquid level of the melted in the chamber 107. The operation of the agitator 108 assists to evenly distribute the heat throughout the molten plastic.

When an initial charge of approximately 1000 kg-2000 kg or approximately 50% capacity of melted plastic is received in the chamber 107, the furnace 110 temperature is caused to rise to 500-650° C., thereby transferring additional heat inside the pyrolysis chamber 107, raising it to between 370-425° C. At this temperature, the plastic becomes gaseous. The reaction of the plastic at this temperature causes the plastic carbon chain lengths to randomly break into various lengths. A subsequent reaction occurs in the catalytic converter 118, the short carbon chain lengths reform and further breaking of longer chains lengths occur, such that the distribution is in the range of C8 to C25 and peaking at C16 (cetane).

The pressure inside the chamber 107 rises marginally above atmospheric to 1.08 bar. The pyrolysis gas is subsequently forced to exit the chamber 107 through the path of least resistance being the pyrolysis gas pipe 128 into the catalyst tower 118. The catalyst is not consumed or poisoned. The catalyst tower 118 contains a series of plates 118a selected from the group including ceramics, zeolites, the silicates of iron $Fe^{3+}$, cobalt $Co^{2+}$, nickel $Ni^{2+}$, Raney nickel, manganese Mn\2+, chromium $Cr^{3+}$, copper $Cu^{2+}$, Rhenium Nickel, and/or their mixtures or the catalyst MCM-41. MCM-41 (Mobile Crystalline Material) is a silicate obtained by a templating mechanism[1,2,3]. It is ordered to some degree, so that there are arrays of non intersecting hexagonal channels, identifiable by TEM, XRD, and vapor adsorption. By changing the length of the template molecule, the width of the channels can be controlled to be witing 2 to 10 nm. The walls of the channels are amorphous $SiO_2$. This feature, together with its exceptional porosity (up to 80%), makes MCM-41 is the least mechanically stable compared to, e.g. other porous silicas, silica gels or zeolites[4]. Attempts to synthesize crystalline MCM-41 are underway.

The catalyst tower 118 is housed in a jacket 117, (usually manufactured from stainless steel), through which exhaust gases from the furnace 110 are diverted through a pipe 116 to heat the catalyst plates 118a to 220° C. or greater. The metal plates 118a are positioned so that the hot pyrolytic gases must take a tortuous path to maximise contact area and time with the metal plates 118a. The hot pyrolysis gases react with the catalytic plates 118a. The metal catalyst of the plates 118a cracks carbon parafinic chains longer than C25 and reforms chains shorter than C6. There is conversion of alpha-olefin chains (1-alkenes) to saturated alkanes. The catalyst of the plates 118a ensures that the final fuel has a carbon chain distribution in the range C8-C25 and peaking at C16 (cetane).

The reformed pyrolysis gases proceed from the catalytic converter 118 to the distillation tower 119, where the gases are condensed in their various fractions. The distillation tower 119 operates in its known form. The various fractions of liquid exit the distillation tower 119 via process lines 120 and enter oil recovery tanks 121. The fuel oil liquid is further pumped to one or more operating intermediate tanks 129. The intermediate tanks 129 can store one day's production. A centrifuge 125, specified for diesel oil operation, is located downstream of the intermediate tanks 129. The centrifuge 125 processes the oil and removes any or virtually all solids and water contained in the oil. However, as will be described below, desulphurisation, a desirable process to remove sulphur contamination f the fuel, requires a chemical process rather than the aforedescribed physical treatment. The centrifuge 125 delivers this oil to a Quality Assurance tank 126 where any additives can be added as necessary, and samples taken for testing. The fuel oil can be sent to mass storage or distributed as necessary.

Other products exiting the distillation tower(s) or condenser(s), are non condensable gases and lights, commonly referred to as white spirits, being the lightest fraction of the carbon chains, typical having chain lengths of less than C6. This product is delivered to the lights tank 124 via process piping 120 where it is stored for distribution.

The non condensable gases continue in the process train and are directed to the gas scrubber 122 where the gases are scrubbed with water The gas scrubber 122 water is periodically, as necessary, automatically dosed with a caustic agent to neutralise the acids which are added dog the scrubbing process. Gases that are not condensed during the scrubbing process are recycled into the furnace 110 to be used for heating.

Char residue remains suspended in the molten plastic during the pyrolysis process. The semi-continuous system is designed to hold approximately 400-600 kg of char per chamber. When this limit is reached, it is indicated by a level indicator 114 which signals to the hot melt feeder to stop feeding melted plastic into die chamber 107. The pyrolysis process continues to operate until all of the existing plastic is pyrolised and the chamber 107 is empty of plastic. The control system turns on the auger system 112 which is built into the pyrolysis chamber 107. The auger 112 extracts the char from the chamber 107 and empties it into a char vessel 113 for removal afterwards. The agitator 108 continues to operate to ensure that all of the char is evacuated from the chamber 107. When this is complete, the semi-continuous process commences again from the beginning.

It is noted that the operation of the condenser 119 is substantially the same as for the condenser 30 included in the batch system as described with reference to FIGS. 1 to 3.

Thermalysis Mass Balance

The values of yield are dependent on plastic types as different plastics have inherent molecular structures that effect yield rates.

For example, 1000 kg of mixed plastic(printed film, waste packaging, etc). Yields the following output:
- 50 kg of char
- 125 of off gas
- 825 kg of liquid fuel/specific gravity 0.82=1006 litres of liquid fuel.
  - 60 litres of lights
  - 946 litres of diesel oil fuel
- Energy
- 250 kW/hr of power
- 30 Gj of-natural gas for heating.

Diesel Desulphurisation Process

Summary

Figure 7:
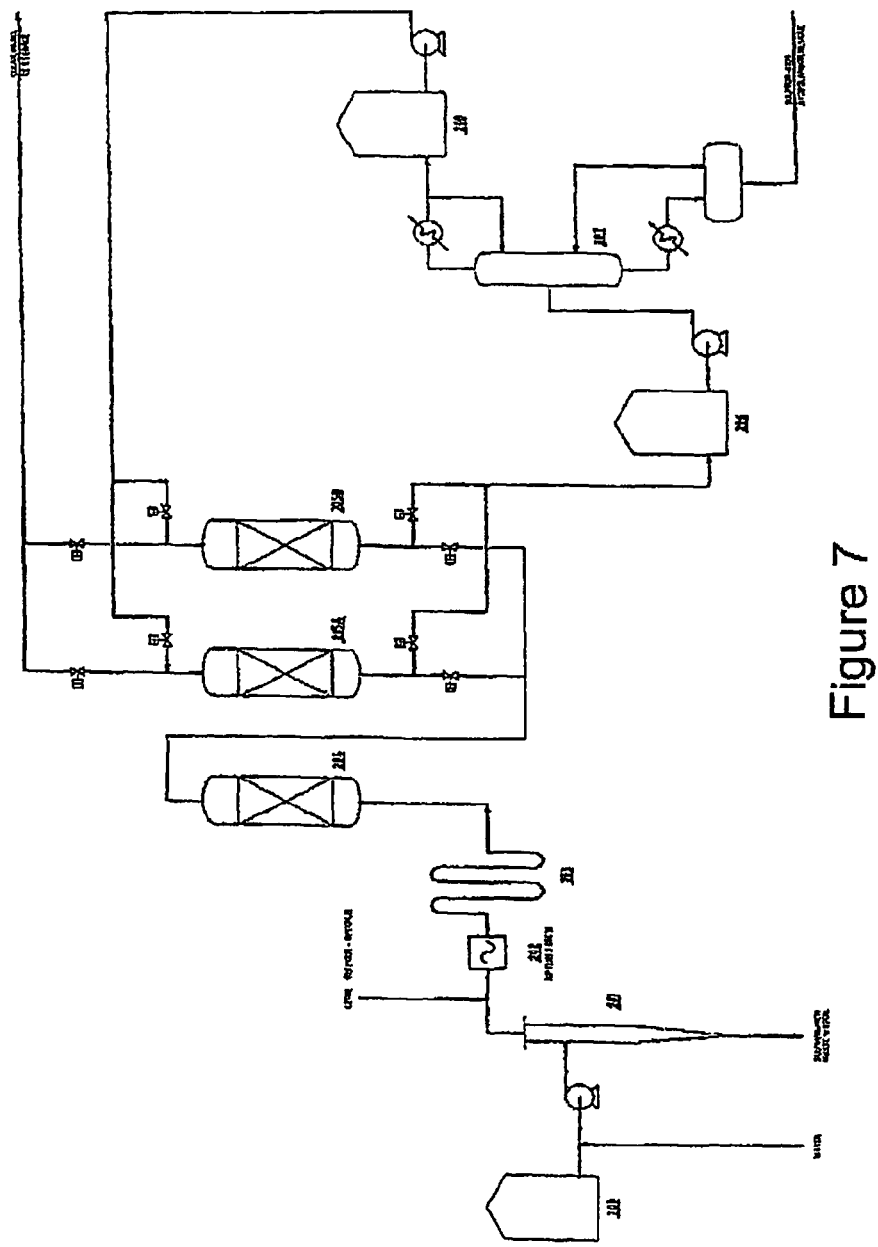
FIG. 7 illustrates a diagrammatic overview of a desulphurising system.

Referring to FIG. 7, a desulphurisation process removes inorganic sulphur by water wash and cyclone separation, and organic sulphur by oxidation and adsorption.

Detail

Diesel from the Storage Tank (200) is mixed wit water, and pumped into a Hydrocyclone Separator (201). The pump is a high-shear type in order to provide a high degree of mixing of water and diesel. Inorganic compounds in the diesel are present in micro-droplets of water, and thus pass into the bulk water phase. The Hydrocyclone removes substantially all of the water, ad hence the inorganic sulfur.

Removal of organic sulphur compounds is achieved by oxidising them to polar compounds, which are then susceptible to adsorption onto zeolite beads. Two optional gaseous oxidising agents are proposed—ozone and oxygen. In the ozone option, the gas is supplied by a conventional Ozone Generator and mixed into the diesel stream. In the oxygen option, oxygen is mixed into the diesel stream, after which free oxygen radicals are generated in the stream by means of ultrasonic sound waves. In both options, sufficient length of pipe is provided downstream (202) to allow the oxidisation reactions to proceed to completion.

The stream then passes through a silica gel Gad Bed (203) which serves to prolong the life of the more expensive zeolite beds. Two zeolite absorption vessels are provided (204 A/B), each consisting of a bed of zeolite beads. Diesel passes through one vessel whilst the other vessel is being regenerated using ethanol. Polar organic sulphur compounds are adsorbed onto the zeolite beads, and bence removed from the diesel stream, which goes to storage. Lean ethanol from tank 207 is pumped through the regenerating bed, desorbing the polar sulphur compounds from the bed before collection in the Rich Ethanol Tank (205). Sulphur-rich compounds are removed from the ethanol stream by distillation in an Ethanol Still (206). A sulphur-rich hydrocarbon stream is produced from the bottom of the stream, and may be re-used in the process as fuel.

Equipment Legend for FIG. 7:
- 200. Diesel storage tank
- 201. Hydrocyclone separator
- 202. Ultrasonic chamber
- 203. Reaction pipe
- 204. Silica gel guard bed
- 205. A/B Zeolite absorption vessel
- 206. Rich ethanol tank
- 207. Ethanol still
- 208. Lean ethanol tank As the present invention way be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden pars together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof."

Item list for 10TPD batch plant described with reference to FIGS. 1 to 3.
- 11 Plastic stock pile
- 12 Conveyor
- 13 Granulator
- 14 Metals container
- 15 Magnet
- 16 Slower
- 17 Fluidised Silo
- 18 Dust collector
- 19 Blower
- 20 Force feeder
- 21 Hot melt feed
- 22 Hot melt manifold
- 23 Nitrogen monitoring device
- 24 Nitrogen storage vessel
- 25 Nitrogen generator
- 26a,b,c,d, Pyrolysis chamber
- 27 Burner
- 28 Furnace
- 29 Catalytic converter, (catalytic reactor)
- 30 a, Condenser
- 31 Chiller unit (water tower)
- 32 Intermediate tank (operating tanks)
- 33 Oil recovery tank
- 34 Gas scrubber
- 35 Caustic make up tank
- 36 Caustic water tank
- 37 Lights tank
- 38 Centrifuge
- 39 Quality assurance (QA) tank
- 40 Off gas burner
- 41 Storage tank
- 42 Agitator Item list for FIG. 6.
- 101 Fluidised hopper
- 102 Flake delivery system
- 103 Crammer
- 104 Hot melt extruder
- 105 Hot melt line
- 106 Two way valve
- 107 Pyrolysis chamber
- 107a Chamber wall
- 108 Agitator
- 108a Agitator blades 109 nitrogen line
110 Furnace
111 Gas burner
112 Char removal auger
113 vessel for containing char
114 Height detector
115 Furnace exhaust flue
116 Exhaust flue to catalytic tower
117 Heating jacket
118 Catalytic tower
118a Catalyst plates
119 Distillation column
120 Process piping
121 Oil recovery tanks
122 Gas scrubber
123 Non condensable gas line to furnace
124 Lights tank
125 Centrifuge
126 QA tank
127 Mass storage
128 Pyrolysis gas pipe
129 Intermediate tank
130 Heating medium vessel
131 Heating medium piping
132 Heating jacket

The invention claimed is:

1. A process for the thermocatalytic conversion of waste organic materials into reusable fuels, comprising the steps of:
   a) delivering waste material to a hot-melt in-feed system to melt the waste material and form a molten material and feeding the molten material into a pyrolysis chamber by the hot-melt in-feed system to partially fill the pyrolysis chamber with the molten material;
   b) further heating said molten waste material in the pyrolysis chamber to a temperature in the range of 390° C. to 410° C. to effect pyrolysis of said material into a gaseous state in a substantially oxygen purged and pressure controlled environment;
   c) continuously agitating the molten waste material in the pyrolysis chamber with a rotating agitator within the pyrolysis chamber during the heating to effect the pyrolysis so as to promote uniform heating in the molten waste material;
   d) continuously mechanically dislodging char from internal upright side walls of the pyrolysis chamber during the pyrolysis process by use of the agitator;
   e) continuously feeding the molten material by the hot-melt in-feed system into the pyrolysis chamber as the pyrolysis therein generates gases;
   f) continuously transferring gases resulting from the pyrolysis to a catalytic converter means wherein the molecular structure of the gaseous material is altered; and
   g) transferring gases from the catalytic converter means to one or more condenser means to distil and cool gases into fractions for recovery as reusable fuels.

2. A process as claimed in claim 1, including the step of receiving said melted waste material in a plurality of said pyrolysis chambers by the selective operation of a manifold system having a corresponding one or more inlet pathways to each pyrolysis chamber.

3. A process according to claim 1, wherein said pyrolysis chamber is one of a plurality of pyrolysis chambers and said process includes the alternate use of each said pyrolysis chamber at least one at a time so that one of said pyrolysis chambers is cooled while another of said pyrolysis chambers transfers gaseous material to said catalytic converter means.

4. A process according to claim 3, including the step of operating each said pyrolysis chamber independently to allow cyclic transferral of gaseous material from one or more of said pyrolysis chambers to the catalytic converter means.

5. A process according to anyone of the preceding claims, including the step of actively cooling the pyrolysis chamber after completing transferral of gaseous waste material therefrom to said catalytic converter means.

6. A process according to claim 1, including the step of mechanically removing char from the pyrolysis chamber during the pyrolysis process.

7. A process according to claim 6, wherein the step of mechanically removing char from pyrolysis chamber during the pyrolysis process is carried out by use of an auger.

8. A process according to claim 1, wherein the said agitator has one or more blades adapted to continuously remove char from the pyrolysis chamber upright wall surface during the pyrolysis process.

9. A process according to claim 1 wherein the condenser means is a distillation column.

10. A process according to claim 1 wherein the pressure in the pyrolysis chamber is about 1.08 bar.

11. A process for the conversion of waste plastic materials into diesel fuels including the steps of:
    a) delivering the comminuted waste plastic material to a hot-melt in-feed system to form a molten material;
    b) transferring the molten waste plastic material through the hot-melt in-feed system to one or more pyrolysis chambers to partially fill the said one or more pyrolysis chambers with the molten waste plastic material;
    c) further heating the molten waste plastic material in the one or more pyrolysis chambers to a temperature in the range of 390° C. to 410° C. to effect pyrolysis of material into a gaseous state in a substantially oxygen purged and pressure controlled environment;
    d) continuously agitating the molten waste material in the one or more pyrolysis chambers with a rotating agitator within the pyrolysis chamber during the heating to effect the pyrolysis so as to promote uniform heating in the molten waste material;
    e) continuously mechanically dislodging char from internal upright side walls of the pyrolysis chamber during the pyrolysis process by use of the agitator;
    f) continuously transferring the molten material by the hot-melt in-feed system into the one or more pyrolysis chambers as the pyrolysis therein generates gases;
    g) continuously transferring the gaseous material from the pyrolysis to a catalytic converter means wherein the molecular structure of the gaseous material is altered; and
    h) transferring gases from the catalytic converter means to condenser means to cool and separate the gaseous material into fractions to form a majority by weight diesel fuel.

12. A process according to claim 11, further including the preliminary step of comminuting or granulating the plastic material into particulate matter prior to delivering the comminuted waste plastic material to the hot-melt in-feed system.

13. A process according to claim 11 wherein the condenser means is a distillation column.

14. A process according to claim 11 wherein the pressure in the pyrolysis chamber is about 1.08 bar.

15. A plant for the conversion of plastic materials into diesel fuels, said plant including:
    a) comminuting means for breaking said plastic material into particulate matter;

b) a hot-melt in-feed system for receiving and melting said particulate plastic material to form a molten plastic material and for transferring the molten plastic material therethrough;

c) a pyrolysis chamber for receiving the molten plastic material from said hot-melt in-feed system until said pyrolysis chamber is partially filled with the molten plastic material, said pyrolysis chamber operative to:
 i) seal the chamber from the environment and to purge air-borne oxidants from said pyrolysis chamber by the introduction of a non-oxidising gas; and
 ii) further heat said molten plastic material to a temperature in the range of 390° C. to 410° C. to effect pyrolysis of said plastic material into a gaseous state in a substantially air-borne oxidant-free and pressure-controlled environment;
 iii) continuously agitate the molten plastic material in the pyrolysis chamber with a rotating agitator within the pyrolysis chamber during the heating to effect the pyrolysis so as to promote uniform heating in the molten plastic material, the agitator within the pyrolysis chamber being further operative to continuously mechanically dislodge char from internal upright side walls of the pyrolysis chamber during the pyrolysis process;
 iv) continuously receive the molten plastic material fed thereto by the hot-melt in-feed system as the pyrolysis therein generates gases;

d) catalytic converter means operative to continuously receive and crack said gaseous material whereby the molecular structure of said gaseous material is altered; and e) condenser means operative to receive, cool and separate said cracked gaseous material into fractions to form a majority by weight diesel fuel.

16. A plant according to claim 15, wherein said plastic material is waste material and said pyrolysis chamber includes an auger to remove accumulating char from the base of said pyrolysis chamber and allow the continuous feed of molten plastic material into said pyrolysis chamber and continuous production and delivery to said catalytic converter means of said gaseous plastic material.

17. A plant according to claim 15, wherein said condenser means includes a selective low-temperature condenser operative to remove light fractions from said cracked gaseous material.

18. A plant according to clam 15, wherein said catalytic converter comprises a series of high-surface area internal metal plate catalysts.

19. A plant according to claim 18, wherein said plate catalyst is selected from the group including ceramics, zeolites, the silicates of iron $Fe^{3+}$, cobalt $Co^{2+}$, nickel $Ni^{2+}$, Raney nickel, manganese $Mn^{2+}$, chromium $Cr^{3+}$, copper $Cu^{2+}$ and/or their mixtures or the catalyst MCM-41.

20. A plant according to claim 14 wherein the condenser means is a distillation column.

21. A plant according to claim 14 wherein the pressure in the pyrolysis chamber is about 1.08 bar.

22. A substantially carbon based fuel product produced by the process of claim 1 or claim 11 or plant of claim 15 that is suitable for use as a diesel fuel.

23. A fuel according to claim 22 wherein said fuel is substantially equivalent to the diesel fuel standard specified as Australian Standard AS 3570-1998.

24. A substantially carbon based fuel product produced by the process of claim 11 that is suitable for use as a diesel fuel.

25. A substantially carbon based fuel product produced by the process of claim 15 that is suitable for use as a diesel fuel.

26. A process as claimed in claim 1, wherein by the hot-melt in-feed system fills the pyrolysis chamber with the molten material to about 80% capacity.

27. A process as claimed in claim 1, wherein the process forms at least a majority by weight diesel fuel.

28. A process as claimed in claim 26, wherein the process forms a fuel product with carbon chains of a length between C6 and C25, peaking at C16.

29. A process as claimed in claim 1, wherein the catalytic converter means operates to alter the molecular structure of the gaseous material by reforming carbon chain molecules of a length less than C5 into longer carbon chain molecules.

30. A process as claimed in claim 1, and wherein the catalyst is not consumed or poisoned.

31. A process as claimed in claim 7, wherein the step of mechanically removing char from each pyrolysis chamber during the pyrolysis process is carried out continuously while the pyrolysis is occurring.

32. A process for the thermocatalytic conversion of waste organic materials into reusable fuels, comprising the steps of:
 a) delivering waste material to a hot-melt in-feed system to melt the waste material and form a molten material and feeding the molten material into a pyrolysis chamber by the hot-melt in-feed system to partially fill the pyrolysis chamber with the molten material to a liquid level;
 b) further heating said molten waste material in the pyrolysis chamber to a temperature in the range of 390° C. to 410° C. to effect pyrolysis of said material into a gaseous state in a substantially oxygen purged and pressure controlled environment;
 c) continuously agitating the molten waste material in the pyrolysis chamber with a rotating action during the heating to effect the pyrolysis so as to promote uniform heating in the molten waste material;
 d) continuously feeding the molten material by the hot-melt in-feed system into the pyrolysis chamber as the pyrolysis therein generates gases;
 e) continuously transferring gases resulting from the pyrolysis to a catalytic converter means wherein the molecular structure of the gaseous material is altered;
 f) transferring gases from the catalytic converter means to one or more condenser means to distil and cool gases into fractions for recovery as reusable fuels; and
 g) continuously mechanically dislodging char from internal upright side walls of the pyrolysis chamber during the pyrolysis process by use of an agitator, wherein said agitator has one or more blades adapted to continuously remove char from the pyrolysis chamber wall surface during the pyrolysis process, the one or more blades having edges providing a close tolerance between the pyrolysis chamber wall surface and the respective blade.

33. A process according to claim 32, wherein the pyrolysis chamber has an inside diameter, the one or more blades of the agitator substantially spanning the inside diameter of the pyrolysis chamber and extending up the upright side walls of the pyrolysis chamber and protruding beyond the liquid level of the molten material in the pyrolysis chamber.

* * * * *